(12) United States Patent
Zhang et al.

(10) Patent No.: US 11,940,998 B2
(45) Date of Patent: Mar. 26, 2024

(54) DATABASE COMPRESSION ORIENTED TO COMBINATIONS OF RECORD FIELDS

(71) Applicant: INTERNATIONAL BUSINESS MACHINES CORPORATION, Armonk, NY (US)

(72) Inventors: Ying Zhang, Beijing (CN); Xiaobo Wang, Beijing (CN); Shuo Li, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 17/806,359

(22) Filed: Jun. 10, 2022

(65) Prior Publication Data

US 2023/0401204 A1  Dec. 14, 2023

(51) Int. Cl.
*G06F 16/242* (2019.01)
*G06F 16/22* (2019.01)
*G06F 16/23* (2019.01)

(52) U.S. Cl.
CPC ........ *G06F 16/244* (2019.01); *G06F 16/2282* (2019.01); *G06F 16/2358* (2019.01)

(58) Field of Classification Search
CPC ...... G06F 16/244; G06F 21/55; G06F 16/283; G06F 21/552
USPC ........................................................ 707/737
See application file for complete search history.

(56) References Cited

U.S. PATENT DOCUMENTS

| | | | |
|---|---|---|---|
| 5,794,229 A | 8/1998 | French | |
| 6,003,036 A * | 12/1999 | Martin | G06F 16/283 707/999.005 |
| 8,386,444 B2 | 2/2013 | Kraus | |
| 8,838,551 B2 | 9/2014 | Fanghaenel | |
| 9,727,572 B2 | 8/2017 | Dani | |
| 9,798,727 B2 | 10/2017 | Dickie | |
| 10,235,100 B2 | 3/2019 | Verma | |
| 10,824,596 B2 | 11/2020 | Mueller | |
| 2008/0071748 A1 * | 3/2008 | Wroblewski | H03M 7/30 |
| 2021/0034598 A1 | 2/2021 | Arye | |
| 2021/0367613 A1 | 11/2021 | Shi | |
| 2021/0405882 A1 * | 12/2021 | Venkatasubbaiah | G06F 16/285 |

OTHER PUBLICATIONS

Disclosed Anonymously, Dynamically compress selective columns based on Real Time Statistics, Electronic Publication Date: Nov. 12, 2014, 23 pages.

(Continued)

*Primary Examiner* — Hung T Vy
(74) *Attorney, Agent, or Firm* — Daniel J. Hakimi

(57) ABSTRACT

This disclosure provides a computer-implemented method, a computer system and a computer program product for database compression oriented to combinations of fields of a database record. One or more combinations of fields of a record of a database are determined that satisfy a frequency criterion indicating that access frequencies of the one or more combinations of fields are higher than an access frequency threshold. The record is reorganized based on the one or more combinations of fields to store fields of each combination of the one or more combinations of fields in a respective contiguous storage space. The reorganized record is compressed by applying a compression scheme to the one or more combinations of fields.

18 Claims, 11 Drawing Sheets

(56) References Cited

OTHER PUBLICATIONS

Funke et al., "Compacting Transactional Data in Hybrid OLTP &OLAP Databases," Proceedings of the VLDB Endowment • Aug. 2012, arXiv:1208.0224v1 [cs.DB] Aug. 1, 2012, https://www.researchgate.net/publication/230609832, 13 pages.

Levandoski et al., "Identifying Hot and Cold Data in Main-Memory Databases," 2013 IEEE 29th International Conference on Data Engineering (ICDE), Apr. 2013, 14 pages.

Mell et al., "The NIST Definition of Cloud Computing", National Institute of Standards and Technology, Special Publication 800-145, Sep. 2011, 7 pages.

Varady, "Master Note for OLTP Compression," Oracle DB/EM Support Blog, Nov. 22, 2010 https://blogs.oracle.com/db/master-note-for-oltp-compression, 30 pages.

* cited by examiner

DATABASE COMPRESSION ORIENTED TO COMBINATIONS OF RECORD FIELDS

BACKGROUND

The present disclosure relates to database technology, and more specifically, to techniques for improving database compression based on selecting appropriate combinations of fields of data records.

A database is a set of data arranged in a way to facilitate access of any required portion of the data by a computer system. A data space for a database consists of one or more tables for storing data. Sometimes, a database also incorporates indexes, i.e., a sorted structure, to help fast query or update data in the database tables. Tables and indexes are stored in one or more pages, each of which is often with a fixed size and serves as a basic unit of input/output (I/O) operation. A database record is an entry consisting of a set of data stored in a database table, particularly in a body part of a page. The set of data in a record corresponds to different fields. In other words, a record is a collection of values for different fields. Typically, each record is arranged as a row that makes up the table and the fields are called columns.

Compression techniques are exploited to reduce the amount of space a table or an index occupies on a disk. An example of a compression technique is compression based on occurrence of bit strings. For instance, during the compression, bit strings that occur frequently are replaced by shorter strings. However, the benefit of disk space saving by the compression is compromised by the need to store a compression dictionary, i.e., information about the mapping of bit strings to their replacement, for decompression. Therefore, an efficient compression scheme is one that brings sufficient disk space saving outweighing its necessary overhead.

SUMMARY

According to one embodiment of the present disclosure, there is provided a computer-implemented method. One or more combinations of fields of a record of a database that satisfy a frequency criterion indicating that access frequencies of the one or more combinations of fields are higher than an access frequency threshold are determined by one or more processing units. The record is reorganized by one or more processing units based on the one or more combinations of fields to store fields of each combination of the one or more combinations of fields in a respective contiguous storage space. The reorganized record is compressed by one or more processing units by applying a compression scheme to the one or more combinations of fields.

According to another embodiment of the present invention, there is provided a computer system. The computer system comprises a processor and a computer-readable memory coupled to the processor, the memory comprising instructions that when executed by the processor implement the methods as provided according to embodiments of the present disclosure.

According to another embodiment of the present disclosure, there is provided a computer program product. The computer program product comprises a computer readable storage medium having program instructions embodied therewith, the program instructions executable by a processor to cause the processor to implement the methods as provided according to embodiments of the present disclosure.

BRIEF DESCRIPTION OF THE SEVERAL VIEWS OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

DETAILED DESCRIPTION

Figure 1:
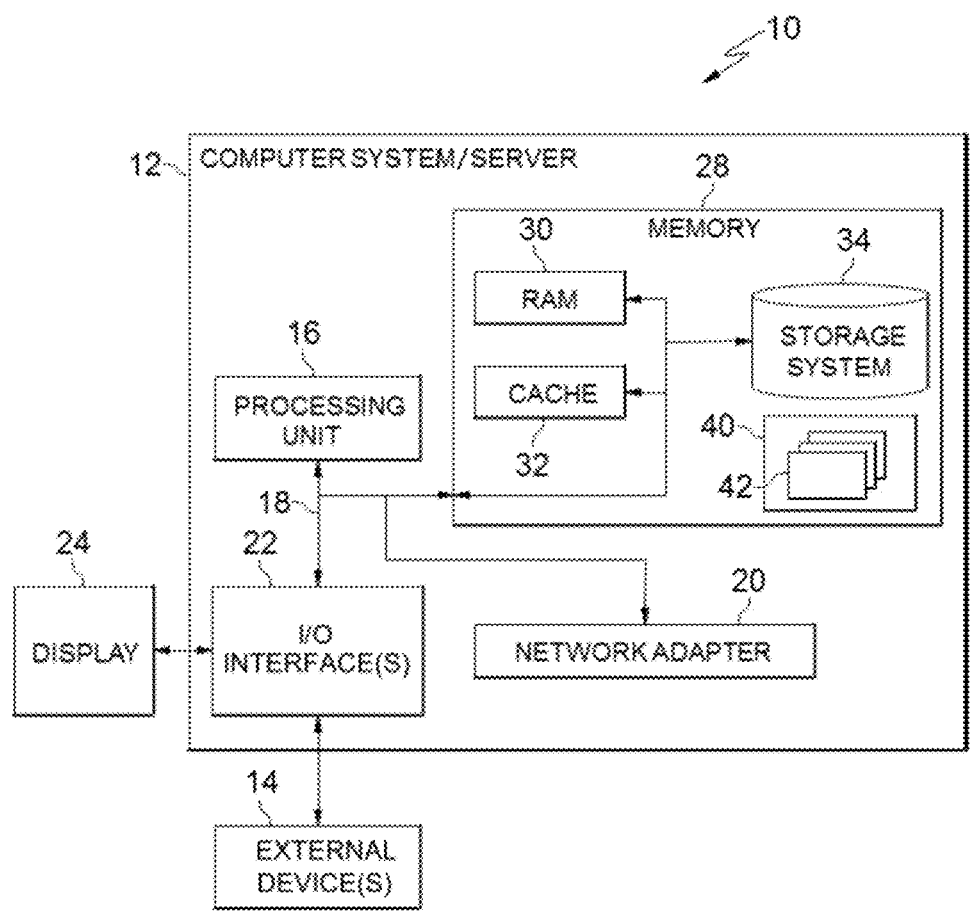
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
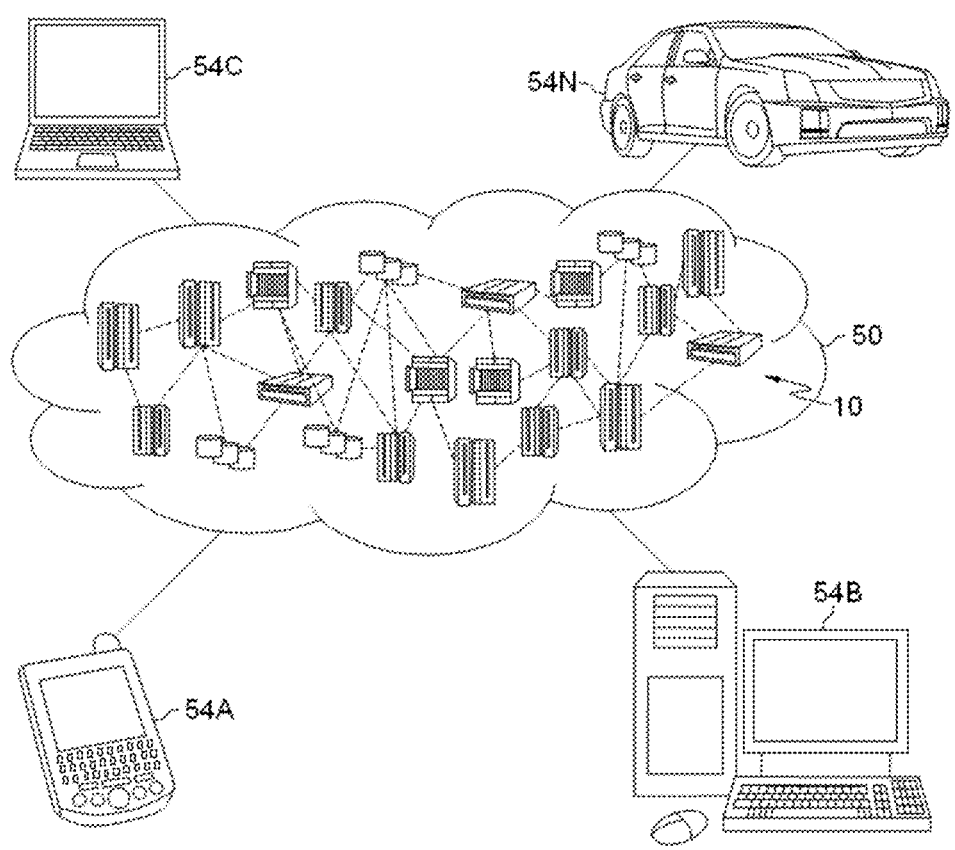
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser). In some embodiments, computing devices 54A-N include one or more client or end-user systems that generate database manipulation operations, such as requests of data insert, deletion, update or data query, to a database storage unit provided by the cloud computing environment 50 and transmit the data manipulation operations to the computing nodes 10 serving as one or more information servers for being performed at the computing nodes.

Figure 3:
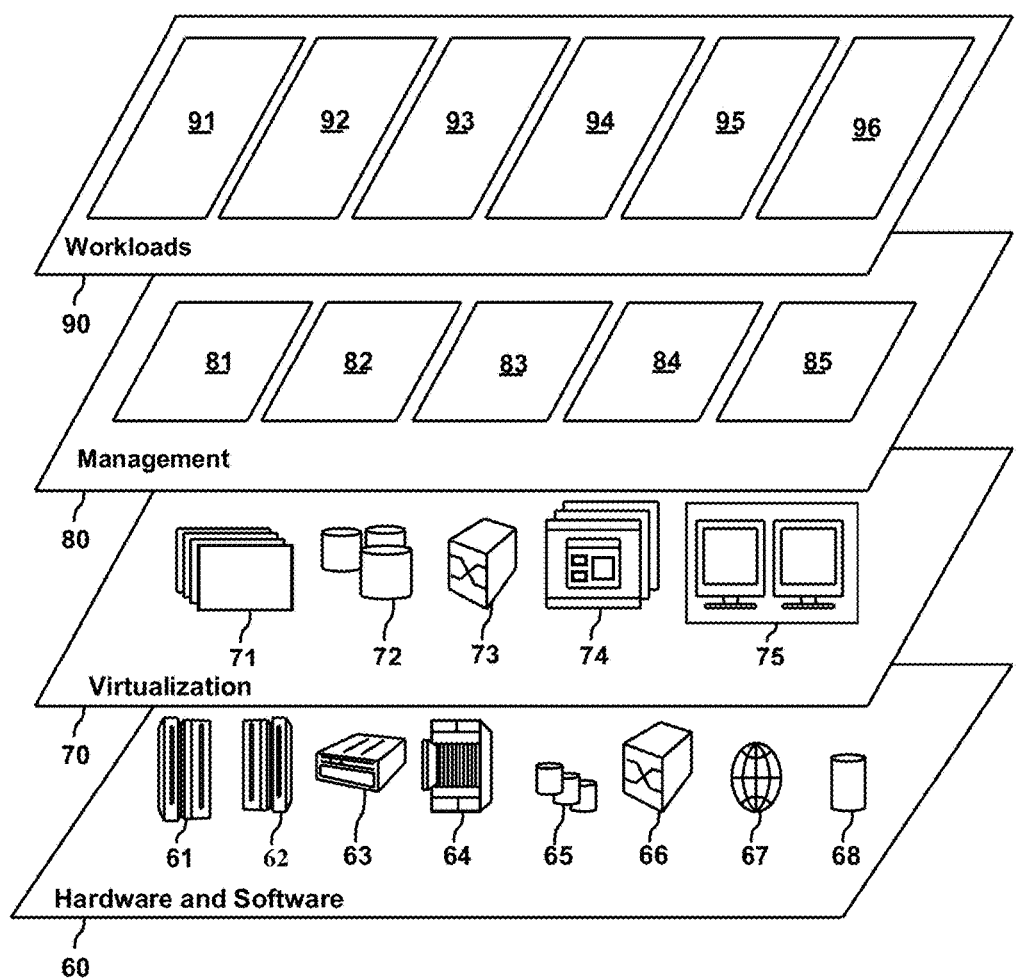
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. Mainframes 61, RISC architecture based servers 62, servers 63 and blade servers 64 may operate as one or more information servers to receive database manipulation operation requests from client or end-user systems implemented by computing devices (such as computing devices 54A-N of FIG. 2) and perform the database manipulation operation requests on data stored in a database storage unit provided by the cloud computing environment 50. The storage devices 65 may operate as the database storage unit for storing data in a database. The database storage unit may be implemented by any database or storage unit. In some embodiments, software components include network application server software 67 and database software 68. Database software 68 may be executed by the one or more information servers implemented by the mainframes or servers 61-64 to facilitate reception of database manipulation operation requests from client or end-user systems and performing the database manipulation operations on the database storage unit. Functions provided by database software 68 comprises database compression oriented to combinations of record fields according to aspects of the present disclosure as will be described with referent to FIGS. 4-11 below.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database compression 96.

A full-page compression is to compress a page including all the rows and columns therein uniformly as a whole using a particular compression scheme. This type of compression has a high cost as it would produce a large amount of metadata such as a dictionary that occupies a huge storage space. In addition, the compression process consumes a lot of Central Processing Unit (CPU) resources in the computation for compressing data in the whole page. Correspondingly the decompression process also consumes considerable CPU resources in the computation.

Compressing all the rows or columns uniformly using the same compression scheme is also unfavorable, because it neglects the difference of features between data in different rows or columns that could have been leveraged to improve overall compression performance. For example, if a table contains columns of which access frequencies vary considerably, it would be beneficial to choose a compression scheme especially suitable for compressing the frequently accessed columns rather than the infrequently accessed columns. As another example, compressibility of data in different columns may vary. Compressibility indicates the ability for a data object (e.g., a table, a page, or a record) to be compressed as much as possible. Compressibility can be measured by a metric of compression rate. The higher the compressibility or the compression rate is, the smaller the size of the compressed data object is. Provided that the access frequencies for two columns are close, it is then preferred to compress one of the two columns that has a better compressibility.

In addition, few of existing methods to improve database compression has considered a combination of columns as a unit to evaluate its access frequency. However, more often in practical use of database, operations such as queries or updates are directed to a particular combination of columns rather than to any column alone. For the particular combination of columns, it is likely that some of the columns are not successive but separated by some infrequently used columns not involved in this particular combination. In such a case, the query or update operations may spend a large scan time to locate the non-successive columns across the table. For example, considering a record that includes successive columns of C1, C2, C3, C4, C5 and C6 and assuming that most of the queries are directed to a combination of (C1, C2, C5), C1 and C2 are successive but C2 and C5 are not, and therefore, the queries will spend a lot of time in scanning to locate C5 from C2.

Embodiments disclosed herein according to aspects of the present disclosure include methods, systems, apparatus and computer program products for database compression oriented to combinations of fields of database records to obtain an improved compression performance. A compression oriented to combinations of fields herein includes identifying combinations of fields of a record in a database that are frequently accessed or used, reorganizing the record to store data in the identified combinations contiguously in storage and compressing the record by applying a compression scheme to the combinations of fields. Since the frequently accessed combinations of fields are identified and compressed, the burden of I/O operations during usage of the record is greatly reduced because the size of frequently fetched data portions becomes smaller. In addition, storing the identified combinations of fields contiguously in storage facilitates compression and decompression of the identified fields, thereby saving CPU resources used in computations for the compression and decompression.

Figure 4:
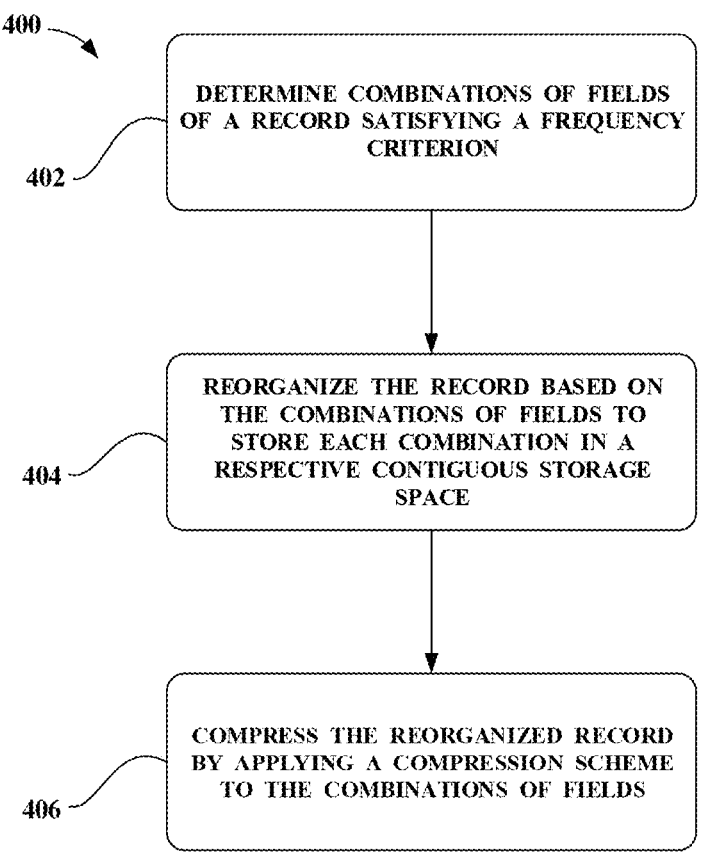
FIG. 4 illustrates a process flow diagram of an illustrative method for improving compression of database records according to an embodiment of the present disclosure.

With reference now to FIG. 4, a process flow diagram of an illustrative method 400 for improving compression of database records according to an embodiment of the present disclosure is illustrated. Method 400 can be performed at one or more information server such as any of the mainframes or servers 61-64 of FIG. 3 as part of database software 68.

Embodiments of the present disclosure may be applied broadly to various kinds of database. Depending on types of stored data, the database may include a structured database (relational database) or an unstructured database. A structured database houses structured data that is in the same format such as granular numbers and statistics that are well organized. An unstructured database houses unstructured data such as multimedia data. Depending on arrangement of database data on a storage space, the database may include a traditional row store (also referred to as "row-oriented") database, a column store (also referred to as "column-oriented") database or a hybrid store database. As previously mentioned, a table or an index of a database is a collection of records each further includes values for one or more fields (or attributes). Considering a table or an index as a matrix of data, then each record corresponds to a row and each field corresponds to a column. In a row store database, a table or an index is stored into one or more pages and in each page, each record or row is stored in a contiguous storage address. That is, a first record is stored in a first contiguous storage address and then the next record is stored in a second contiguous storage address following the first contiguous storage address. Column store database is commonly used in an Online Transaction Processing (OLTP) system. In a column store database, each field or column is stored in a contiguous storage address, and the storage addresses for different fields are separate. Column store database is typically used in an Online Analytical Processing (OLAP) system. In Partition Attributes Across (PAX) data store, as an example of hybrid store database, each field is still stored in a contiguous storage address of a page, but the storage addresses for successive fields are contiguous in the page as blocks or chunks. In other words, for the PAX data store, a table is partitioned horizontally according to the fields or attributes into pages and each page contains contiguous storage spaces (i.e. blocks or chunks) for storing values of several columns. PAX data store integrates advantages of both column store and row store.

At block 402, the information server determines one or more combinations of fields of a record of a database that satisfy a frequency criterion. The frequency criterion indicates that access frequencies of the one or more combinations of fields are higher than an access frequency threshold.

A database may include one or more tables (or partitioned tables) and sometimes one or more indexes (or partitioned indexes). A record may be from a table, an index, a partitioned table or a partitioned index. For ease of description, unless otherwise indicated, a table as used hereinafter may refer to an un-partitioned table or a partitioned table, and an index as used hereinafter may refer to an un-partitioned index or a partitioned index. For purpose of discussion herein, each record of a table or an index is presumed to have the same set of fields, while values of the fields may be different. In this way, when a table or an index has more than one record, any operations described herein as being performed to a record may be equivalently performed to each of the records.

A combination of fields may include one field only, or a group of two or more fields. When the combination contains a group of two or more field, the group may be ordered or unordered. The combination or group being ordered means that there is an order for the fields of the combination or groups to be accessed.

A access frequency of a combination of fields indicates a number of access operation in which the fields in the combination being accessed together, either without any order when the combination is unordered or in an order as indicated by the ordered combination, divided by a number of all the access operations directed to the record. Therefore, an access frequency of a combination is a percent between 0 and 1. In a case that a combination of fields is ordered, access frequencies of two combinations of fields involving the same fields but with different orders may be different. For example, an access frequency of a combination of fields (C1, C3) (C1, C3 are two fields) is different from an access frequency of a second combination of fields (C3, C1) if it has been required that any combination of fields is ordered. On the other hand, if there is no requirement that any combination of fields is ordered, then the access frequencies for combination (C1, C3) and combination (C3, C1) may be the same. As will be described later, it is advantageous to have a combination of fields being ordered.

A access frequency of a combination of fields can be obtained or determined by the information server from a statistic data structure in the database. The statistic data structure may be located in a page header of a page of a table or an index that keeps simple statistic data for the page. The statistic data structure may be additionally or alternatively located in a real time statistic data structure in a metadata for the whole database object that keeps overall statistic data for the database. In some embodiments, the information server may perform the statistics and update the statistic data structure during usage of the database periodically or non-periodically.

A frequency criterion as mentioned herein is directed to a combination of fields. Any combination of fields, if described as satisfying a frequency criterion, has an access frequency higher than an access frequency threshold. In some embodiments, the access frequency threshold may be a predefined percent, such as 50%, 70%, 90% or higher. In this way, it is possible to identify those combinations of fields that have absolutely high access frequencies, e.g., higher than 95%. In some other embodiments, the access frequency threshold may be specific to the combination of fields of which the access frequency is evaluated and may be access frequencies of other combinations of fields of the same record. In this case, a combination of fields of a record satisfying a frequency criterion indicates that the access frequency of the combination of fields is higher than some or all of the other combinations of fields of the same record. Therefore, in some cases, combinations of fields determined in this way have the topmost access frequency among all the possible combinations of a record. In some other cases, combinations of fields determined in this way may not or not only have the topmost access frequency, but can still have relatively high access frequencies among all the combinations. In some embodiments, after determining an access frequency for each possible combination of fields of a record, all the combinations may be ranked from the highest access frequency to the lowest and a number of combinations from the top may be selected. In general, the determined combinations of fields of a record may have absolutely or relatively high access frequencies among all the combinations of fields of the record.

Figure 5:
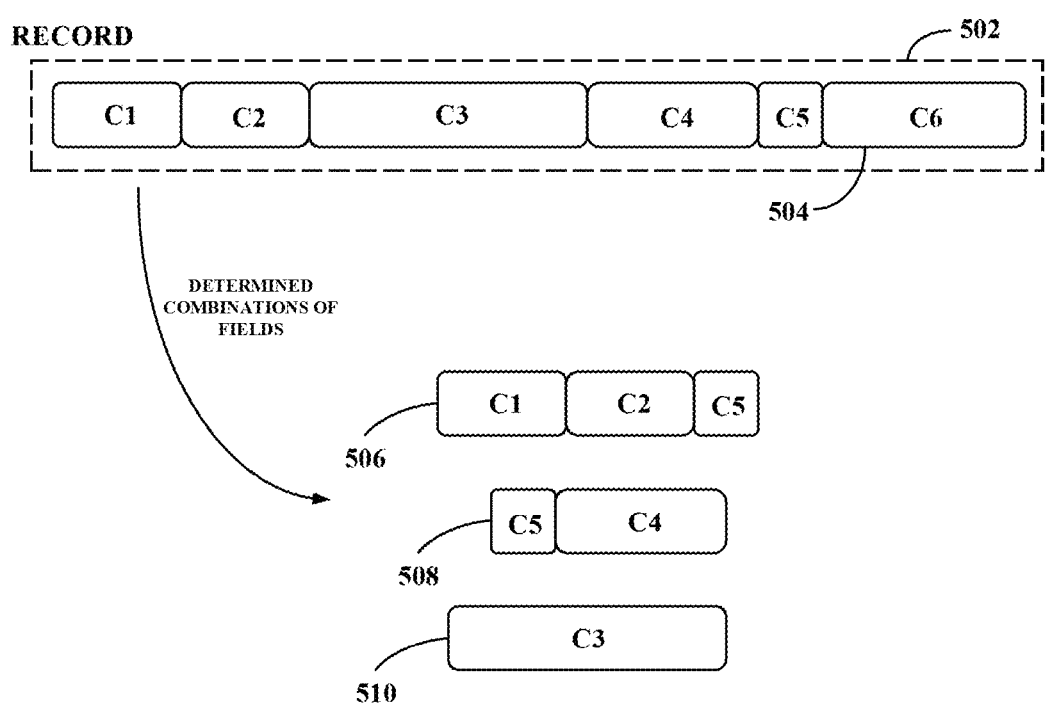
FIG. 5 illustrates an example of determining combinations of fields from a record based on the frequency criterion according to an embodiment of the present disclosure.

An example of determining combinations of fields from a record based on the frequency criterion is illustrated in FIG. 5. A record 502 includes six fields 504, i.e. C1, C2, ..., C6. Some of the fields 504 may have different lengths for values filled therein. After determining combinations of fields based on the frequency criterion, three combinations of fields 506, 508, 510 that have the top three access frequencies among all the combinations of fields of the record 502 are selected. The selected combinations of fields 506, 508, 510 may have different numbers of fields such as one, two and three as shown in FIG. 5 and different lengths. The selected combinations of fields may indicate an order between the fields therein. For example, the selected combination (C5, C4) indicates that when this combination is accessed, field C5 is accessed prior to field C4.

In some embodiments, the combinations of fields are determined such that the determined combinations have no common field. Considering two combinations both having absolutely or relatively high access frequencies and thus both satisfying the frequency criterion, if the two combinations include one or more same fields, one of them will be abandoned; otherwise if the two combinations has no shared field in common, they can both be selected. For example, in the example of FIG. 5, at least one of combinations (C1, C2, C5) and (C5, C4) should be given up in the determined combinations, while both combinations (C5, C4) and (C3) can be kept in the determined combinations. Finally, the determined combinations can be (C1, C2, C5) and (C3), or can be (C5, C4) and (C3), or any single one combination from the three combinations of (C1, C2, C5), (C5, C4) and (C3).

Referring again to FIG. 4, at block 404, the information server may reorganize the record based on the one or more determined combinations of fields to store each combination of the one or more determined combinations of fields in a respective contiguous storage space.

Figure 6A:
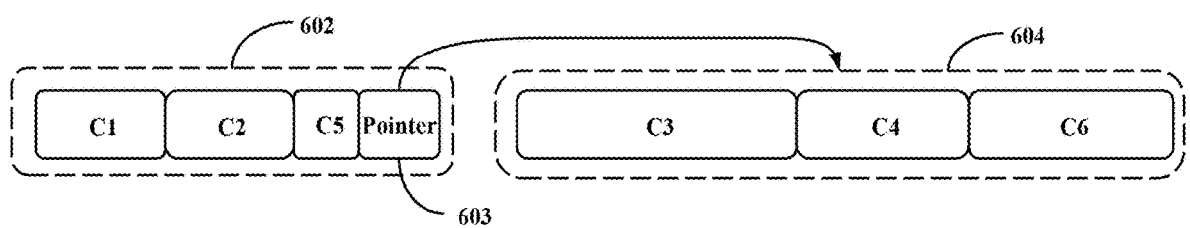
FIGS. 6A-6B respectively show examples of reorganizing a record based on one determined combination of fields and two determined combinations of fields according to an embodiment of the present disclosure.

Each combination of the combinations of fields determined at block 402 may has one or more fields. Reorganizing the record based on the determined combination results in that the record is rearranged to store the one or more fields in a contiguous storage space, even if the one or more fields are not successive fields in the original record. When the combination of fields is an ordered group of two or more fields, the two or more fields are stored contiguously in an order as indicated by the combination. FIG. 6A shows an example of reorganizing a record based on one determined combination of fields. Similar to FIG. 5, in FIG. 6A, the original record comprises a sequence of fields C1 to C6. The determined combination of fields is an ordered group of (C1, C2, C5). The result of reorganizing the record based on (C1, C2, C5) is that fields C1, C2 and C5 are stored in a contiguous storage space 602 in the order of C1 followed by C2 and then by C5.

With the determined combinations of fields indicating an order of the fields in a combination and reorganizing the record based on the order is advantageous because the order of accessing fields is utilized and reflected in the storage layout. When performing query or update operations on the reorganized record later, the involved fields would not need to be sorted then, which reduces the CPU resources used during the later operations and shortens the response time of the database to the operations.

Figure 6B:
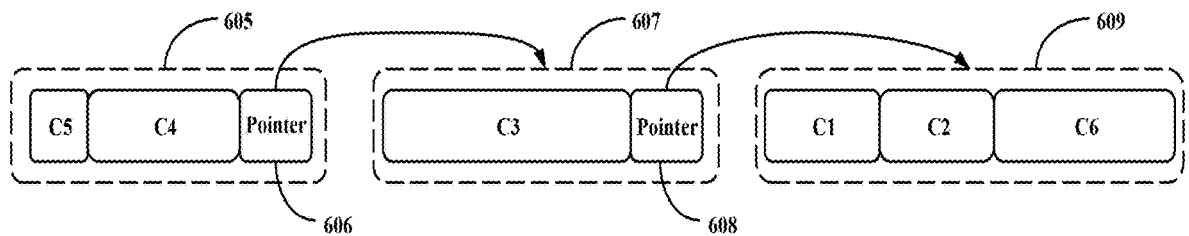

When two or more combinations of fields are determined at block 402 and provided that the two or more combinations of fields have no shared fields, reorganizing the record based on the two or more combinations of fields includes rearranging the storage of the record such that for each of the determined combination of fields, fields included in that combination are stored contiguously. FIG. 6B shows an example of reorganizing a record based on two determined combinations of fields. Similar to FIG. 5, in FIG. 6B, the original record comprises a sequence of fields C1 to C6. This time the determined combinations of fields are an ordered group of (C5, C4) and a group of (C3). The result of reorganizing the record based on (C5, C4) and (C3) is that fields C5 and C4 are stored in a contiguous storage space 605 and field C3 is stored in a contiguous storage space 607. A pointer 606 is added to the end of the first storage space 605 to link the first storage space 605 to an address of the second storage space 607.

The allocated contiguous storage spaces for different determined combinations of fields may be contiguous or non-contiguous, or may be arranged on the same page or extent or not.

Fields in the determined combinations and fields not in the determined combinations are stored separately. For the fields of the record not included in the determined combinations of fields, they may be stored in other storage locations either contiguously or non-contiguously. A pointer is also added to contiguous storage spaces for storing the determined combination of fields to link the contiguous storage spaces to storage locations for storing the fields not included in the determined combinations of fields. In FIG. 6A, fields C3, C4 and C6 are the remaining fields from the determination or selection and are stored in storage locations collectively referred to as storage space 604. Pointer 603 is added to the end of storage space 602 to link storage space 602 to storage space 604. In FIG. 6B, fields C1, C2 and C6 are the remaining fields from the determination or selection and are stored in storage locations collectively referred to as storage space 609. Pointer 608 is added to the end of storage space 607 to link storage space 607 to storage space 609.

The operation of reorganizing the record based on determined combinations of fields at block 404 can be performed no matter whether a database containing the original record is stored as a row store or a column store. If the database is a row store, fields of each record are already stored contiguously. After the reorganization, for each record, fields in the determined combinations are stored contiguously respectively and fields not included in the determined combinations may be stored separately from the determined combinations. If the database is a column store, for each field, data in all the records are stored contiguously. That is, each field indicates a vector of data. Different fields may be stored in non-contiguous storage spaces. Even if two fields are located on the same page, they are in an order as indicated by the original record. After the reorganization, fields included in the determined combinations are stored contiguously in an order as indicated by the combination, which means that a vector of data for the first field of the combination is contiguously followed by a vector of data for the second field of the combination and so forth. Still referring to FIG. 6A, if the original record is stored row-wise, field C1, C2 or C5 of the combination (C1, C2, C5) each refers to a data value; if the original record is stored column-wise, field C1, C2 or C5 each refers to a vector of data stored contiguously. But in either case, field C1, C2 and C5 can still be stored contiguously.

The reorganization of the record may be realized using an existing database manipulation tool. For example, some database suppliers provide a database maintenance tool or functionality named as 'REORG' to help reorganize database tables, eliminate fragmentation and reclaim space. The reorganization of the record at block 404 may be carried out based on the existing tool 'REORG' with the determined combinations of fields being input as parameters to the tool.

Referring again to FIG. 4, at block 406, the information server may compress the reorganized record by applying a compression scheme to the one or more combinations of fields.

The compression scheme applied to the determined combinations of fields may be selected to fit for data in the fields of the determined combinations to improve a compression rate for the determined combinations. For example, the compression scheme may be selected based on data patterns in the fields of the determined combinations. Examples of compression schemes include but not limited to dictionary compression and Arithmetic coding such as Huffman compression.

When more than one combination of fields is determined, the information server may apply the same compression scheme to all the determined combinations, or may apply different compression schemes to at least two of the determined combinations so that each combination may be subject to an appropriate compression scheme for an improved compression rate.

For the fields of the record not included in the determined combinations of fields, they may be compressed or not compressed. If compressed, they may be compressed with the same compression scheme with at least one of the determined combinations of fields, or they may be compressed with a compression scheme different from any of the compression schemes applied to the determined combinations of fields. Since the fields not included in the determined combinations are subject to relatively less access, even if they are not compressed, the burden of I/O operations produced in association with these fields would not be large. In some embodiments, the fields not included in the determined combinations of fields may be compressed with a compression scheme not with an improved compression rate but with reduced computation complexity for the compression so that the benefit of compression is obtained at a low cost.

In some embodiments, information about the compression scheme(s) applied to the one or more determined combinations of fields may be stored in the database, e.g. in a metadata of the database, for later decompression of the record. For example, if a dictionary compression is applied, the dictionary for the compression may be stored in the database so that the compressed record can be decompressed later based on the dictionary.

It can be recognized that by determining and compression the combinations of fields that satisfy the frequency criterion, which means the frequently accessed combinations of fields are compressed, the burden of I/O operations during usage of the record is greatly reduced because the size of frequently fetched data portions becomes smaller. In addition, storing the identified combinations of fields contiguously in storage facilitates compression and decompression of the identified fields, thereby saving CPU resources used in computations for the compression and decompression.

In addition to the frequency criterion as described above, the combinations of fields for reorganization and compression can be further determined or selected based on a basic length criterion and/or an optimization ratio criterion.

The basic length criterion indicates that a length of a combination of fields to be determined for a record should be not less than a basic length for the record. The basic length for a record is a length of a record in a case that available space of a page containing the record is distributed over a maximum number of records that is allowed in the page. Specifically, the basic length (denoted as Basic_length) for a record may be calculated as follows in equation (1):

$$\text{Basic\_length} = \frac{S_{page} \times (1 - p_{free})}{\max\_record\_num}, \quad (1)$$

where $S_{page}$ is a size of a page containing the record, $p_{free}$ is a percent of unavailable space among a whole space of the page, and max_record_num is a maximum number of records that is allowed in the page. $S_{page}$, $p_{free}$ and max_record_num are all easily obtained parameters from a statistic data structure of a database, such as in a page header, and thus calculation of basic length can be easily implemented without causing much computation overhead requirement of additional specialized functionalities or components.

The basic length criterion is further applied to determine or select the combinations of fields because sometimes combinations of fields that have a short length may be determined or selected if only the frequency criterion is applied. For example, in FIG. 5, a combination including a single field C5 may also be determined as having a relatively high access of frequency and thus selected. It means that if, after the reorganization, C5 is stored contiguously as a record and the remaining fields are stored separately. However, the length of C5 may be shorter than the basic length as calculated above. Then even if C5 is compressed, the space of the page set free by the compression of C5 cannot be utilized to hold any more data but are left unused. Therefore, it would be advantageous to further require that the determined combinations of fields should satisfy the basic length criterion in addition to the frequency criterion.

Figure 7:
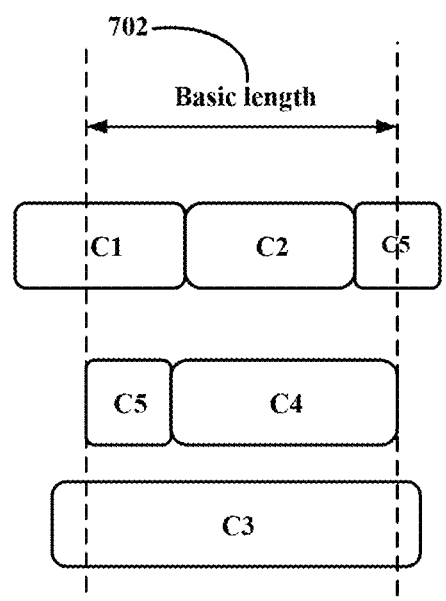
FIG. 7 illustrates an example of determining combinations of fields based on a basic length criterion in addition to the frequency criterion according to an embodiment of the present disclosure.

FIG. 7 illustrates an example of determining combinations of fields based on a basic length criterion in addition to the frequency criterion. The combinations (C1, C2, C5), (C5, C4) and (C3) are selected because they have the topmost access frequencies and their lengths are greater than or equal to a basic length 702. While combinations (C1), (C2), (C4) and (C5) may also have similar high or even higher access frequencies, they are not selected because they fail to satisfy the basic length criterion.

It is further recognized by inventors of the present disclosure that it is advantageous to further consider the compressibility of the combinations in determining or selecting appropriate combinations. For example, if two combinations have equal or close access frequencies, but one combination can be compressed much more aggressively than the other, which means that the one combination has better compressibility, then it would be beneficial to choose the one with better compressibility even if its access frequency is a bit lower than the other.

The optimization ratio criterion considers both the access frequency criterion and the compressibility. If a combination of fields satisfies the optimization ratio criterion, it means that the optimization ratio of the combination of fields is less than an optimization ratio threshold. The optimization ratio for a combination of fields of a record indicates a weighted compressed length of the record calculated based on the access of frequency of the combination of fields, a compressed length of the record, and a length of the record.

In some embodiments, the optimization ratio (denoted as Opti_Ratio) for a combination of fields of a record may be calculated as follows in equation (2):

$$\text{Opti\_Ratio} = f_{access} \times \text{RLength}_{compressed} + w \times (1 f_{access}) \times \text{RLength}_{uncompressed} \quad (2),$$

where $\text{RLength}_{compressed}$ is a compressed length of the record by applying a compression scheme to the combination of fields, $\text{RLength}_{uncompressed}$ is a length of the record when it is uncompressed, $f_{access}$ is an access frequency of the combination of fields and w is a predefined constant value. Since different compression schemes applied to the same combination might lead to different compressed lengths of the record, the $\text{RLength}_{compressed}$ may be set as the shorted compressed length or an average of all the different compressed lengths.

Variants of optimization ratios are acceptable as long as they can also characterize both the access frequency criterion and the compressibility. In some embodiments, a variant of the optimization ratio for a combination of fields indicates a weighted number of pages occupied by a table or index containing the record based on combination-oriented compression. Specifically, a variant of the optimization ratio (denoted as Opti_Ratio') for a combination of fields of a record may be calculated as follows in equation (3):

$$\text{Opti\_Ratio}' = f_{access} \times \frac{N_{record}}{\min(\lfloor S_{page} \times (1 - p_{free})/\text{RLength}_{compressed} \rfloor, \max\_record\_num)} + \quad (3)$$

$$w' \times (1 - f_{access}) \times \frac{N_{record}}{\min(\lfloor S_{page} \times (1 - p_{free})/\text{RLength}_{uncompressed} \rfloor, \max\_record\_num)}$$

where $S_{page}$, $p_{free}$ and max_record_num are the same as those in equation (1), $\text{RLength}_{compressed}$, $\text{RLength}_{uncompressed}$ and $f_{access}$ are the same as those in equation (2), $N_{record}$ is a total number of records in the table or index containing the record, $\lfloor \ldots \rfloor$ is a floor function to round a number down and w' is a predefined constant value.

Similar to the basic length, the calculation of optimization ratios does not additional or dedicated functionalities or components as all the involved parameters can be easily obtained from a statistic data structure of a database. Therefore, no much computation overhead or consumption of CPU resources would be caused during the calculation of optimization ratios.

To apply the optimization ratio criterion, in some embodiments, one or more combinations of fields are initially determined based on the frequency criterion and then an optimization ratio is calculated for each combination. The optimization ratio threshold may be a predefined value to select a combination that has an absolutely low optimization ratio, or optimization ratios of other combinations to select a combination that has a relatively low optimization ratio. In some embodiments, one or more combinations of fields that has the lowest optimization ratio are selected based on the optimization ratio criterion. It can be seen that when both the frequency criterion and the optimization criterion are applied, the frequency threshold may be used to initially determine a number of combinations to calculate the optimization ratios and the optimization ratio threshold may be used to finally determine the one or more combinations.

Figure 8:
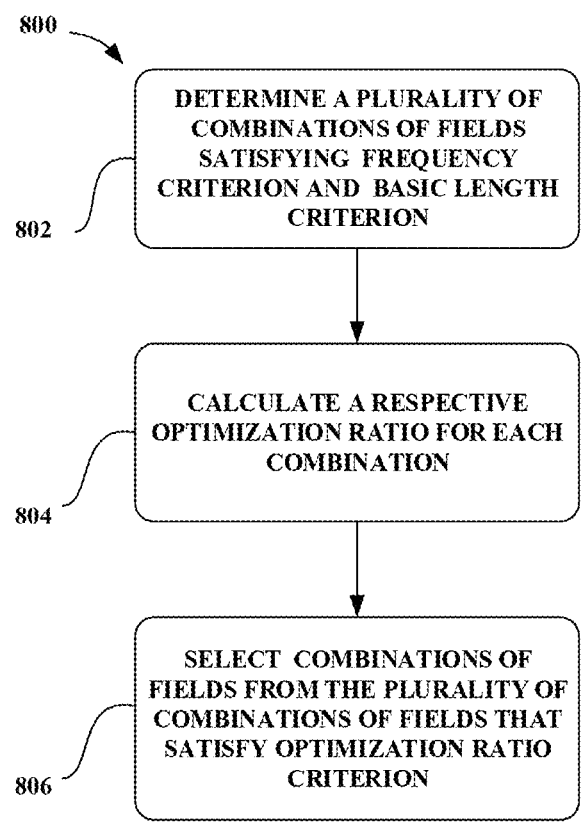
FIG. 8 illustrates a process flow diagram of a method for determining combinations of fields of a record according to an embodiment of the present disclosure.

In some embodiments, all of the frequency criterion, the basic length criterion and the optimization ratio criterion are applied to determine or select appropriate combinations of fields of a record. In this regard, FIG. 8 illustrates a process flow diagram of a method 800 for determining combinations of fields of a record according to an embodiment of the present disclosure. Method 800 is provided to illustrate a flow process of applying the different criteria during the determination of combinations. Details of the terms or operations omitted here for conciseness can be restored with a reference to the above.

At block 802, the information server determines a plurality of combinations of fields of the record that satisfy the frequency criterion and the basic length criterion. The frequency criterion indicates that the access frequency of each determined combination is greater than an access frequency threshold and the basic length criterion indicates that the access frequency of each determined combination is not less than a basic length for the record.

At block 804, the information server calculates a respective optimization ratio for each of the plurality of combinations of fields. As already described above, the respective optimization ratio indicates a weighted compressed length of the record calculated based on the access of frequency of the combination of fields, a compressed length of the record, and a length of the record.

At block 806, the information server selects one or more combinations of fields from the plurality of combinations of fields that satisfy an optimization ratio criterion indicating that optimization ratios of the selected one or more combinations of fields are less than an optimization ratio threshold.

The operations at block 802-806 can be performed as an implementation of operation at block 402 of FIG. 4. The selected or determined one or more combinations of fields can then be used for reorganizing and compressing the record as illustrated at blocks 404 and 406.

In some cases, the number of combinations of fields determined based on the frequency criterion and the basic length criterion may still be large. If an optimization ratio is calculated for each combination, the CPU and memory resources for the calculation would be considerably high. To control the overhead generated in the determination or selection of appropriate combinations of fields, a calculation storage limit may be introduced. Specifically, a calculation storage with a predefined size is allocated to cache the combinations of fields temporarily determined during the determination or selection for later calculation of optimization ratios. If the calculation storage is used up, no more temporary combination of fields will be determined and stored to the calculation storage. All the combinations already stored in the calculation storage are then subject to the calculation of optimization ratios. The combinations that have optimization ratios less than the optimization ratio threshold are finally determined or selected.

Figure 9:
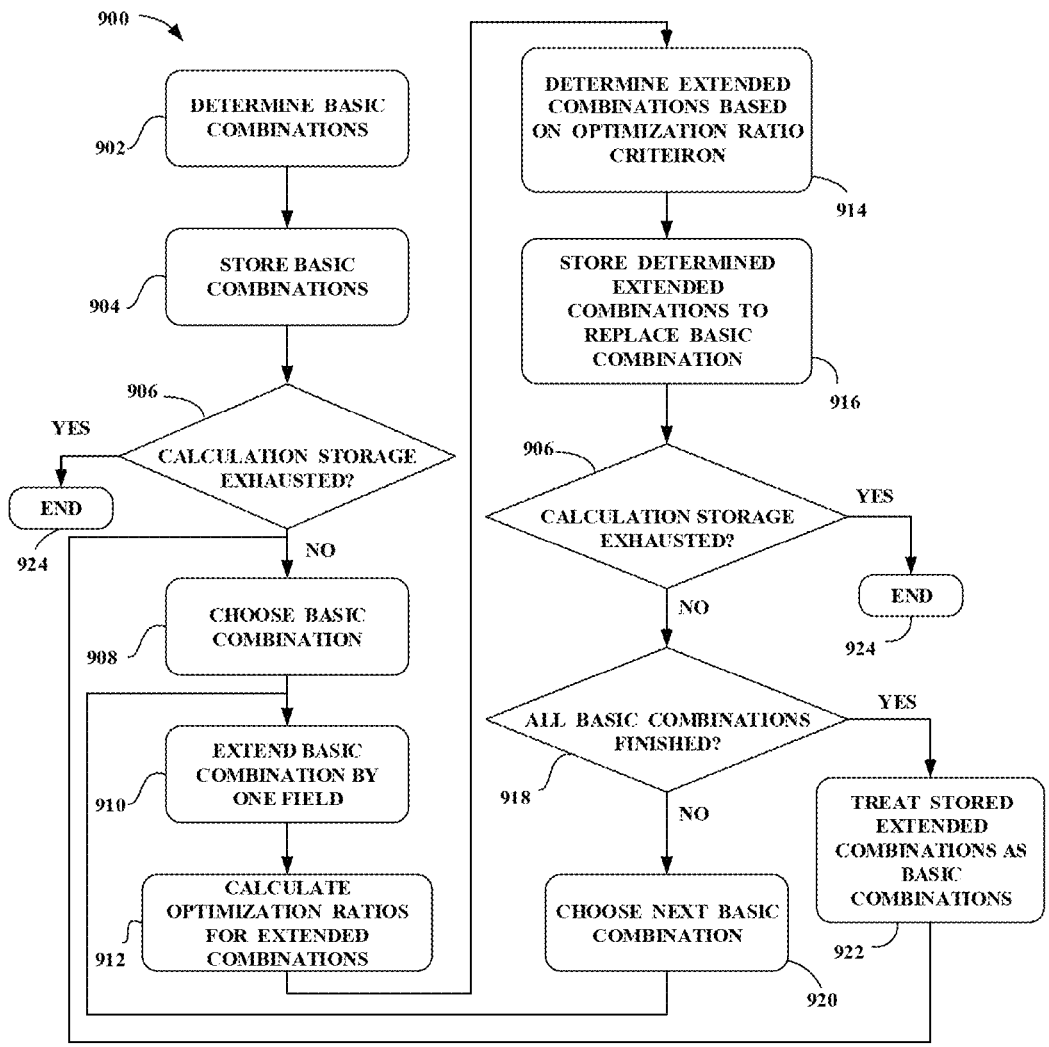
FIG. 9 illustrates a process flow diagram of a method for determining combinations of fields of a record according to an embodiment of the present disclosure.

FIG. 9 illustrates a process flow diagram of a method 900 for determining combinations of fields of a record according to an embodiment of the present disclosure. It is recognized by inventors of the present disclosure that when two combinations have the same or close optimization ratio, selecting the one with larger number of fields in the combination is more beneficial. Therefore, in method 900, more combinations generated by extending from basic combinations based on the frequency criterion and the basic length to increase the number of fields included in the combinations are evaluated. In addition, the calculation storage limit is introduced to converge the extending.

At bock 902, the information server determines one or more basic combinations based on the frequency criterion and the basic length. Note that the basic combinations are not coarsely determined based on the basic length criterion as described above, but are finely determined based on the basic length. It means that the lengths of the basic combinations may be equal to the basic length or closely greater than the basic length. Stated another way, if any one field of a basic combination is taken away, the length of the basic combination would be less than the basic length. For example, if a length of a combination (C1, C2) is less than the basic length, but a length of the combination of (C1, C2, C5) is greater than the basic length, then the combination (C1, C2, C5) is considered as a basic length. Basic combinations also need to satisfy the frequency criterion which means that the access frequencies of the basic combinations may be absolutely or relatively high.

At block 904, the information server stores the basic combinations in a calculation storage. The calculation storage may have a predefined size as desired.

At block 906, the information server determines if a space of the calculation storage is exhausted. If the calculation storage could not hold all the basic combinations, then some basic combinations may be abandoned and the process goes to block 924. The left combinations stored in the calculation storage are the ones for which the optimization ratios are to be calculated.

If the calculation storage still has available space, operations at blocks 908-920 will be iteratively performed for each of the basic combinations until all the basic combinations are traversed or until the space of the calculation storage is exhausted. For each basic combination, the result of the operations at blocks 908-920 is that one more field from the remaining fields not included in the basic combination is appended to the basic combination to generate one or more extended combinations. If the optimization ratio criterion is satisfied and the calculation storage permits, the one or more extended combinations may be stored in the calculation storage to replace the original basic combination. In this way, the number of combinations in the calculation storage expands and the length of each combination grows.

Specifically, at block 908, a basic combination (such as a first basic combination) is chosen from the basic combinations as determined at block 902. At block 910, the basic combination is extended by one field of the fields not included in the basic combination. If there are N fields in the record and M fields are included in the basic combination, N and M are integers greater than 1 and N is greater than M, then at block 910, the basic combination is extended into N-M extended combinations each having one more different field than the basic combination. At block 912, optimization ratios are calculated for the extended combinations using the method as described above. At block 914, one or more extended combinations are determined based on an optimization ratio criterion indicating that the determined extended combinations have optimization ratios less than an optimization ratio threshold. At block 916, the determined extended combinations are stored in the calculation storage to replace the corresponding basic combination before the extension. Next, at block 906, it is checked again if the calculation storage is exhausted. If the calculation storage is exhausted, then the process goes to block 924 and exits from the iterations. Otherwise, it is then determined at block 918 if all the basic combinations have been extended. If not, the next basic combination will be chosen as an objective to perform operations of blocks 910-918. When all the basic combinations are finished, the basic combinations have been replaced by more extended combinations and the extended combinations will be treated as the basic combinations to experience another round of iterations. Eventually, the only one condition to trigger termination of the loop is that the space of the calculation storage is so exhausted that no more extended combinations can be stored therein.

At either termination 924 of the process, the calculation storage is filled of several combinations of fields. Then one or more combinations of fields that satisfy the optimization ratio threshold, such as the one or more combination of fields that have the smallest optimization ratios will be selected.

Figure 10B:
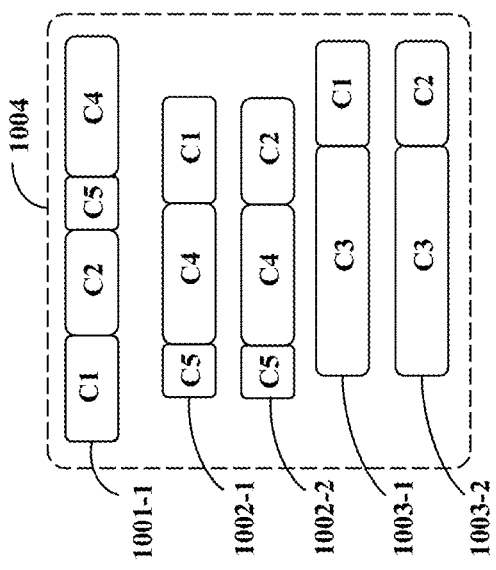
FIGS. 10A-10C illustrate an example of determining a combination of fields and using the determined combination of fields to reorganize the record according to an embodiment of the present disclosure.
Figure 10C:
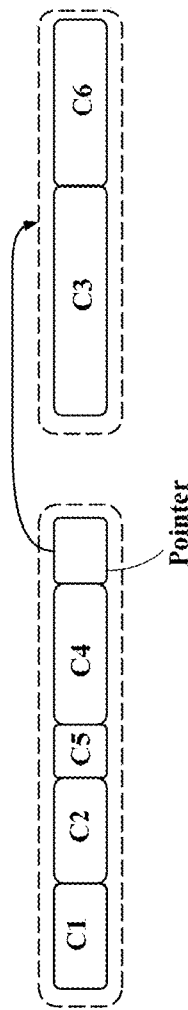
Figure 10A:
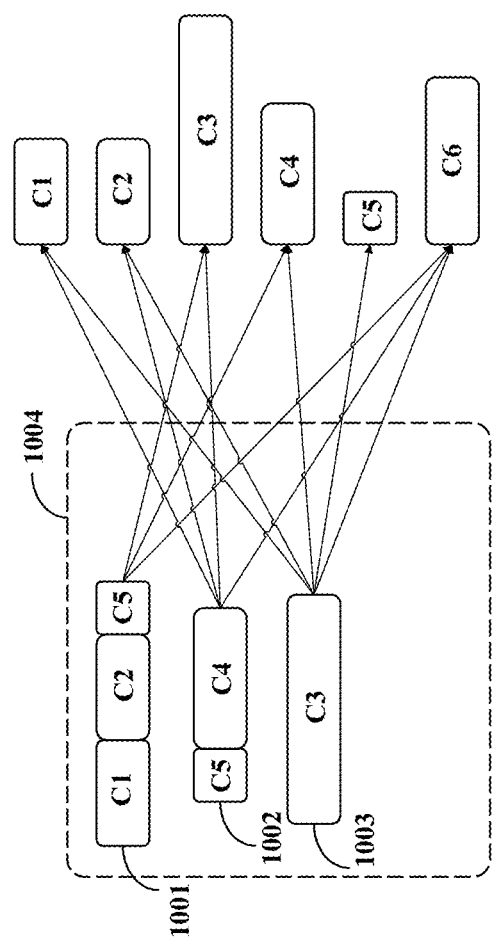

FIGS. 10A-10C illustrate an example of determining a combination of fields based on the method of 900 and using the determined combination of fields to reorganize the record according to an embodiment of the present disclosure. In FIG. 10A, the initial basic combinations determined based on the frequency criterion and the basic length are (C1, C2, C5) 1001, (C5, C4) 1002 and (C3) 1003. The basic combinations 1001-1003 are stored in a calculation storage 1004. Since the calculation storage 1004 has more space to hold more and longer combinations, each basic combination is extended by one more additional field. For combination 1001, field C3, C4 and C6 are respectively appended thereto so that three extended combinations are generated based on combination 1001. By calculating the optimization ratios of the three extended combinations originating from combination 1001 and applying an optimization ratio criterion, the one with the smallest optimization ratio, which is combination (C1, C2, C5, C4) 1001-1 is kept and stored into the calculation storage 1004 by replacing the original basic combination (C1, C2, C5). Similarly, extended combinations (C5, C4, C1) 1002-1 and (C5, C4, C2) 1002-2 replace the original combination 1002, and extended combinations (C3, C1) 1003-1 and (C3, C2) 1003-2 replace the original combination 1003, as shown in FIG. 10B. Since the calculation storage 1004 is now used up, no more extension will be carried out. By calculating the optimization ratios of the five combinations kept in the calculation storage 1004 and applying the optimization ratio criterion, finally the combination 1001-1 having the smallest optimization ratio is selected. As shown in FIG. 10C, the record is then reorganized based on the combination 1001-1 so that C1, C2, C5 and C4 are stored in a contiguous storage space with a pointer pointed to other storage locations for storing the remaining fields C3 and C6.

Although in the example of FIGS. 10A-10C, only one round of extension is performed based on the basic combinations because of the limited calculation storage, it should be recognized that, if the calculation storage has been set to a larger size, more rounds of extension based on the basic combinations are possible.

During usage of a database, access frequencies of fields and also combinations of fields of a record may change over time. Accordingly, it may be desirable to update the determined combinations of fields to track this change.

Figure 11:
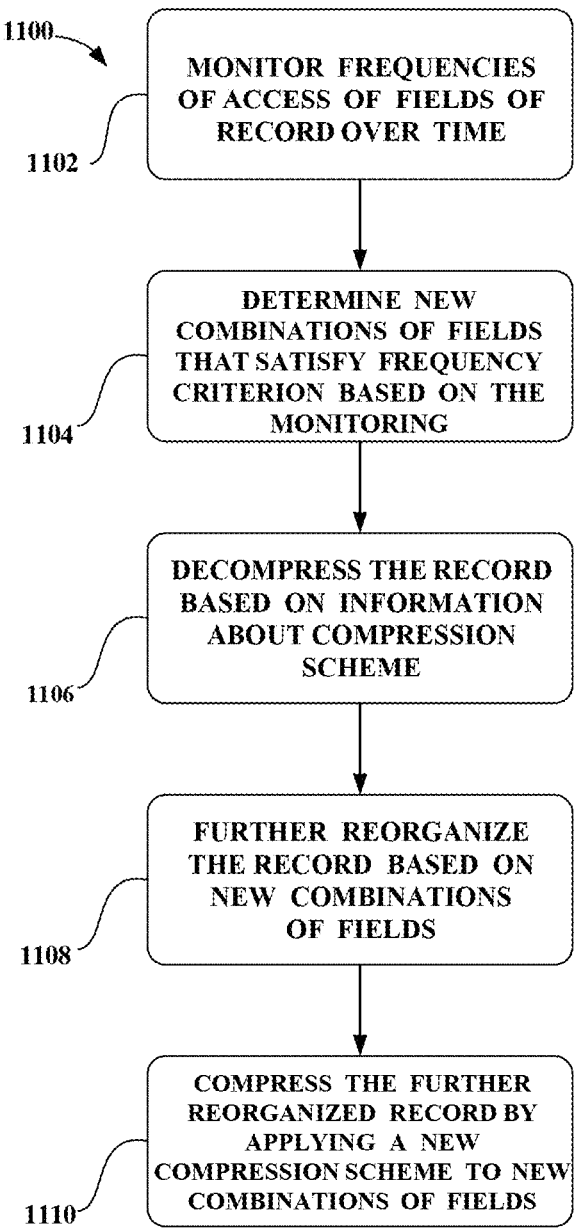
FIG. 11 illustrates a flow graph of an exemplary method according to an aspect of the present disclosure.

FIG. 11 illustrates a flow graph of an exemplary method 1100 according to an aspect of the present disclosure.

Method 1100 may be performed as a supplement to method 400 to adapt to the change of access frequencies over time.

At block 1102, the information server monitors access frequencies of fields of the record over time. The access frequencies of fields comprise access frequencies of combinations of fields with an order between the fields or without any order between the fields. The access frequencies of fields may be collected and monitored using a commercially available or self-customized statistic tool for the database. The statistic tool may support real-time statistic work related to access frequencies of any portion of data in a database.

At block 1104, the information server determines one or more new combinations of fields that satisfy the frequency criterion based on the monitoring. The frequency criterion indicates that access frequencies of the one or more new combinations of fields are higher than an access frequency threshold. The determination of the new combinations is performed in the same way as at block 402 of method 400 of FIG. 4 except that the access frequency threshold may be the same with or different from the access frequency threshold at block 402. The resultant determined combinations this time are different from the original determined combinations at block 402.

At block 1106, the information server decompresses the original record based on information about the previously applied compression scheme, such as the compression scheme applied at block 406 of method 400 of FIG. 4. As mentioned earlier, the information about the applied compression scheme may be stored in the database. When it is time for decompression, the information is acquired from the database to be used in the decompression.

At block 1108, the information server further reorganize the decompressed record based on the new combinations of fields and at block 1110, the information server compresses the further reorganized record by applying a new compression scheme to the new combinations of fields. Operations of block 1108 and 1110 are almost the same with operations at block 404 and 406 of FIG. 4 except that this time a new scheme may be applied because the new combinations probably have a different data pattern from the previously determined combinations of fields due to the insert, delete and update operations to data in the database.

As such, by dynamically adjusting the determined combinations, the reorganization or storage layout of the record could almost always fit for the usage pattern of data in the database and accordingly it may be guaranteed that an appropriate compression scheme is almost always applied. With method 1100, the compression of the database would be more robust to any changes in the usage pattern of the database.

It should be recognized that method 1100 could be used in combination with any of the methods for determining an appropriate combination of fields as described above with a reference to FIGS. 7-10C.

It should be noted that the processing of database compression oriented to combinations of fields of a record according to embodiments of this disclosure could be implemented by computer system/server 12 of FIG. 1.

The present invention may be a system, a method, and/or a computer program product at any possible technical detail level of integration.

According to an embodiment of the present disclosure, there is provided a computer system. The computer system comprises a processor and a computer-readable memory coupled to the processor. The memory comprises instructions that when executed by the processor perform determining one or more combinations of fields of a record of a database that satisfy a frequency criterion indicating that frequencies of access of the one or more combinations of fields are higher than a frequency of access threshold. The memory comprises instructions that when executed by the processor further perform reorganizing the record based on the one or more combinations of fields to store fields of each combination of the one or more combinations of fields in a respective contiguous storage space. The memory comprises instructions that when executed by the processor further perform compressing the reorganized record by applying a compression scheme to the one or more combinations of fields.

According to an embodiment of the computer system, at least one of the one or more combinations of fields comprises an ordered group of multiple fields.

According to an embodiment of the computer system, the compression scheme is selected to improve a compression rate for at least one of the one or more combinations of fields.

According to an embodiment of the computer system, the one or more combinations of fields comprises at least two combinations of fields that have no shared fields.

According to an embodiment of the computer system, the compressing the reorganized record comprises applying different compression schemes to at least two of the one or more combinations of fields.

According to an embodiment of the computer system, the memory further comprises instructions that when executed by the processor perform obtaining the frequencies of access of the one or more combinations of fields from a statistic data structure in the database.

According to an embodiment of the computer system, the memory further comprises instructions that when executed by the processor perform monitoring frequencies of access of fields of the record over time, determining, based on the monitoring, one or more new combinations of fields that satisfy the frequency criterion indicating that frequencies of access of the one or more new combinations of fields are higher than a frequency of access threshold, decompressing the record based on information about the compression scheme, further reorganizing the record based on the one or more new combinations of fields to store each of the one or more new combinations of fields in a respective contiguous storage space and compressing the further reorganized record by applying a new compression scheme to the one or more new combinations of fields.

According to an embodiment of the computer system, the determined one or more combinations of fields further satisfies a basic length criterion indicating that a length of each of the one or more combinations of fields is not less than a basic length for the record, and the basic length for the record is a length of a record in a case that available space of a page containing the record is distributed over a maximum number of records that is allowed in the page.

According to an embodiment of the computer system, the determined one or more combinations of fields further satisfies an optimization ratio criterion indicating that optimization ratios of the determined one or more combinations of fields are less than an optimization ratio threshold, and an optimization ratio for a combination of fields indicates a weighted compressed length of the record calculated based on the access of frequency of the combination of fields, a compressed length of the record, and a length of the record.

According to an embodiment of the computer system, the determining the one or more combinations of fields of the record further comprises determining a plurality of combinations of fields of the record that satisfy the frequency criterion and a basic length criterion indicating that a length of each of the plurality of combinations of fields is not less than a basic length for the record, calculating a respective optimization ratio for each of the plurality of combinations of fields, the respective optimization ratio indicating a weighted compressed length of the record calculated based on the access of frequency of the combination of fields, a compressed length of the record, and a length of the record, and selecting the one or more combinations of fields from the plurality of combinations of fields that satisfy an optimization ratio criterion indicating that optimization ratios of the selected one or more combinations of fields are less than an optimization ratio threshold.

According to an embodiment of the computer system, a number of combinations of the plurality of combinations of fields is further limited by a calculation storage allocated to cache the plurality of combinations of fields.

According to an embodiment of the present disclosure, there is provided a computer program product. The computer program product comprises a computer readable storage medium having program instructions embodied therewith. The program instructions are executable by a processor to cause the processor to perform aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by one or more processing units, one or more combinations of fields of a record of a database that satisfy a frequency criterion indicating that access frequencies of the one or more combinations of fields are higher than an access frequency threshold;
   reorganizing, by one or more processing units, the record based on the one or more combinations of fields to store fields of each combination of the one or more combinations of fields in a respective contiguous storage space; and
   compressing, by one or more processing units, the reorganized record by applying a compression scheme to the one or more combinations of fields,
   wherein the determined one or more combinations of fields further satisfies an optimization ratio criterion indicating that optimization ratios of the determined one or more combinations of fields are less than an optimization ratio threshold, and
   wherein an optimization ratio for a combination of fields indicates a weighted compressed length of the record calculated based on the access of frequency of the combination of fields, a compressed length of the record, and a length of the record.

2. The computer-implemented method of claim 1, wherein at least one of the one or more combinations of fields comprises an ordered group of multiple fields.

3. The computer-implemented method of claim 1, wherein the compression scheme is selected to improve a compression rate for at least one of the one or more combinations of fields.

4. The computer-implemented method of claim 1, wherein the one or more combinations of fields comprise at least two combinations of fields that have no shared fields.

5. The computer-implemented method of claim 4, wherein the compressing the reorganized record comprises:
   applying, by one or more processing units, different compression schemes to at least two combinations of fields from the one or more combinations of fields.

6. The computer-implemented method of claim 1, further comprising:

obtaining, by one or more processing units, the access frequencies of the one or more combinations of fields from a statistic data structure in the database.

7. The computer-implemented method of claim 1, further comprising:
monitoring, by one or more processing units, access frequencies of fields of the record over time;
determining, by one or more processing units and based on the monitoring, one or more new combinations of fields that satisfy the frequency criterion indicating that access frequencies of the one or more new combinations of fields are higher than an access frequency threshold;
decompressing, by one or more processing units, the record based on information about the compression scheme;
further reorganizing, by one or more processing units, the record based on the one or more new combinations of fields to store each of the one or more new combinations of fields in a respective contiguous storage space; and
compressing, by one or more processing units, the further reorganized record by applying a new compression scheme to the one or more new combinations of fields.

8. The computer-implemented method of claim 1, wherein the determined one or more combinations of fields further satisfies a basic length criterion indicating that a length of each of the one or more combinations of fields is not less than a basic length for the record, and
wherein the basic length for the record is a length of a record in a case that available space of a page containing the record is distributed over a maximum number of records that is allowed in the page.

9. The computer-implemented method of claim 1, the determining the one or more combinations of fields of the record further comprising:
determining, by one or more processing units, a plurality of combinations of fields of the record that satisfy the frequency criterion and a basic length criterion indicating that a length of each of the plurality of combinations of fields is not less than a basic length for the record;
calculating, by one or more processing units, a respective optimization ratio for each of the plurality of combinations of fields, the respective optimization ratio indicating a weighted compressed length of the record calculated based on the access of frequency of the combination of fields, a compressed length of the record, and a length of the record; and
selecting, by one or more processing units, the one or more combinations of fields from the plurality of combinations of fields that satisfy an optimization ratio criterion indicating that optimization ratios of the selected one or more combinations of fields are less than an optimization ratio threshold.

10. The computer-implemented method of claim 9, wherein a number of combinations of the plurality of combinations of fields is further limited by a calculation storage allocated to cache the plurality of combinations of fields.

11. A computer system comprising:
a processor; and
a computer-readable memory coupled to the processor, the memory comprising instructions that when executed by the processor perform:
determining one or more combinations of fields of a record of a database that satisfy a frequency criterion indicating that access frequencies of the one or more combinations of fields are higher than an access frequency threshold;
reorganizing the record based on the one or more combinations of fields to store fields of each combination of the one or more combinations of fields in a respective contiguous storage space; and
compressing the reorganized record by applying a compression scheme to the one or more combinations of fields,
wherein the determined one or more combinations of fields further satisfies an optimization ratio criterion indicating that optimization ratios of the determined one or more combinations of fields are less than an optimization ratio threshold, and
wherein an optimization ratio for a combination of fields indicates a weighted compressed length of the record calculated based on the access of frequency of the combination of fields, a compressed length of the record, and a length of the record.

12. The computer system of claim 11, wherein at least one of the one or more combinations of fields comprises an ordered group of multiple fields.

13. The computer system of claim 11, wherein the one or more combinations of fields comprise at least two combinations of fields that have no shared fields, and wherein the compressing the reorganized record comprises:
applying different compression schemes to at least two combinations of fields from the one or more combinations of fields.

14. The computer system of claim 11, wherein the determined one or more combinations of fields further satisfies a basic length criterion indicating that a length of each of the one or more combinations of fields is not less than a basic length for the record, and
wherein the basic length for the record is a length of a record in a case that available space of a page containing the record is distributed over a maximum number of records that is allowed in the page.

15. A computer program product, comprising a computer readable storage medium having program instructions embodied therewith, the program instructions executable by a processor to cause the processor to:
determine one or more combinations of fields of a record of a database that satisfy a frequency criterion indicating that access frequencies of the one or more combinations of fields are higher than an access frequency threshold;
reorganize the record based on the one or more combinations of fields to store fields of each combination of the one or more combinations of fields in a respective contiguous storage space; and
compress the reorganized record by applying a compression scheme to the one or more combinations of fields,
wherein the determined one or more combinations of fields further satisfies an optimization ratio criterion indicating that optimization ratios of the determined one or more combinations of fields are less than an optimization ratio threshold, and
wherein an optimization ratio for a combination of fields indicates a weighted compressed length of the record calculated based on the access of frequency of the combination of fields, a compressed length of the record, and a length of the record.

16. The computer program product of claim 15, wherein at least one of the one or more combinations of fields comprises an ordered group of multiple fields.

17. The computer program product of claim 15, wherein the one or more combinations of fields comprises at least two combinations of fields that have no shared fields, and wherein the program instructions that cause the processor to compress the reorganized record further comprise the program instructions to cause the processor to:
- apply different compression schemes to at least two of the one or more combinations of fields.

18. The computer program product of claim 15, wherein the program instructions further cause the processor to:
- monitor access frequencies of fields of the record over time;
- determine, based on the monitored access frequencies, one or more new combinations of fields that satisfy the frequency criterion indicating that access frequencies of the one or more new combinations of fields are higher than an access frequency threshold;
- decompress the record based on information about the compression scheme;
- further reorganize the record based on the one or more new combinations of fields to store each of the one or more new combinations of fields in a respective contiguous storage space; and
- compress the further reorganized record by applying a new compression scheme to the one or more new combinations of fields.

* * * * *